United States Patent [19]

Jarman et al.

[11] Patent Number: 4,610,093
[45] Date of Patent: Sep. 9, 1986

[54] UNIBODY GAUGE SUPPORT

[75] Inventors: Davis R. Jarman, Hortense; Virgil H. Hinson, Brunswick, both of Ga.

[73] Assignee: Grabber Manufacturing Company, Brunswick, Ga.

[21] Appl. No.: 750,493

[22] Filed: Jul. 1, 1985

[51] Int. Cl.⁴ ............................................. G01B 5/25
[52] U.S. Cl. ................................ 33/180 AT; 33/288; 33/181 AT
[58] Field of Search ........... 33/288, 180 AT, 181 AT; 411/400

[56] References Cited

U.S. PATENT DOCUMENTS

| 3,869,804 | 3/1975 | Friend | 33/288 |
| 4,207,681 | 6/1980 | Bayorgeon et al. | 33/180 AT |
| 4,329,784 | 5/1982 | Bjork | 33/180 AT |

FOREIGN PATENT DOCUMENTS 549687 12/1942 United Kingdom ............... 411/400

Primary Examiner—Harry N. Haroian
Attorney, Agent, or Firm—Harvey B. Jacobson

[57] ABSTRACT

An elongated vertically disposed shank construction is provided defining a longitudinal center axis and the upper end of the shank construction includes structural features enabling the shank construction upper end to be anchored relative to a vehicle frame portion having a vertical bore formed therethrough with the longitudinal center axis of the shank construction coinciding with a selected edge portion of the bore. Further, the lower end of the shank construction includes location determining structure disposed on the longitudinal center axis of the shank construction, whereby frame measurement locations determined by specified margin edges of vertical bores formed in the vehicle frame may be established at an elevation spaced below the frame.

9 Claims, 5 Drawing Figures

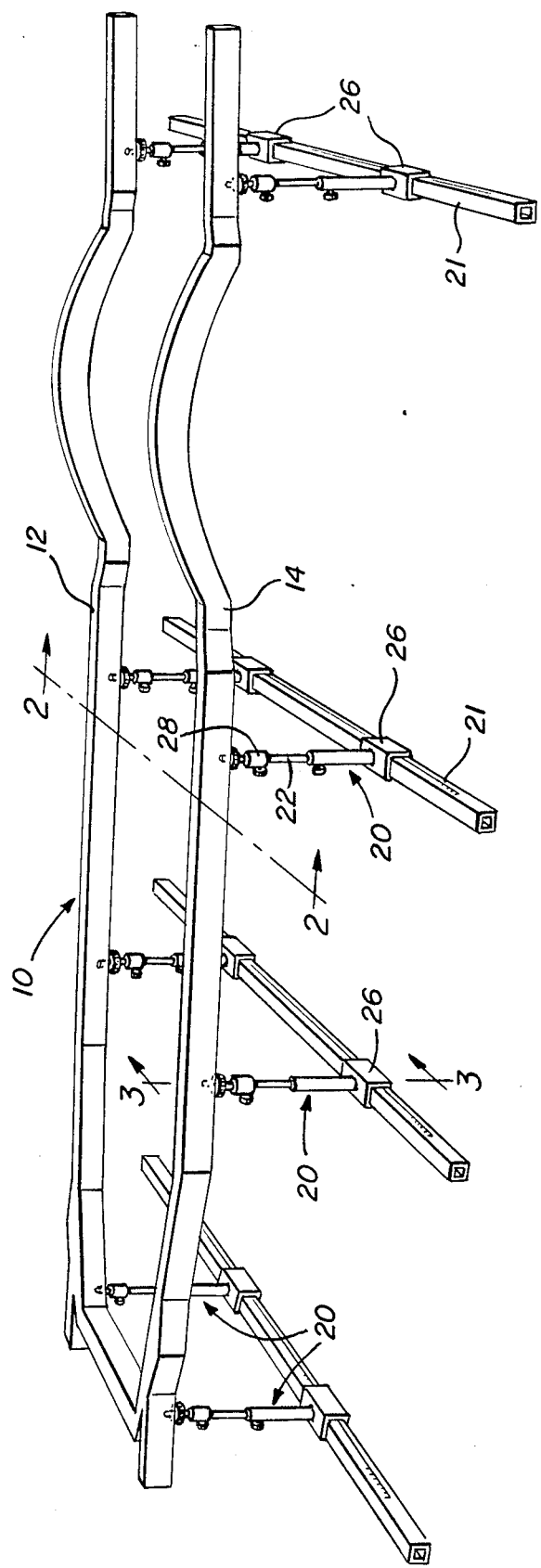
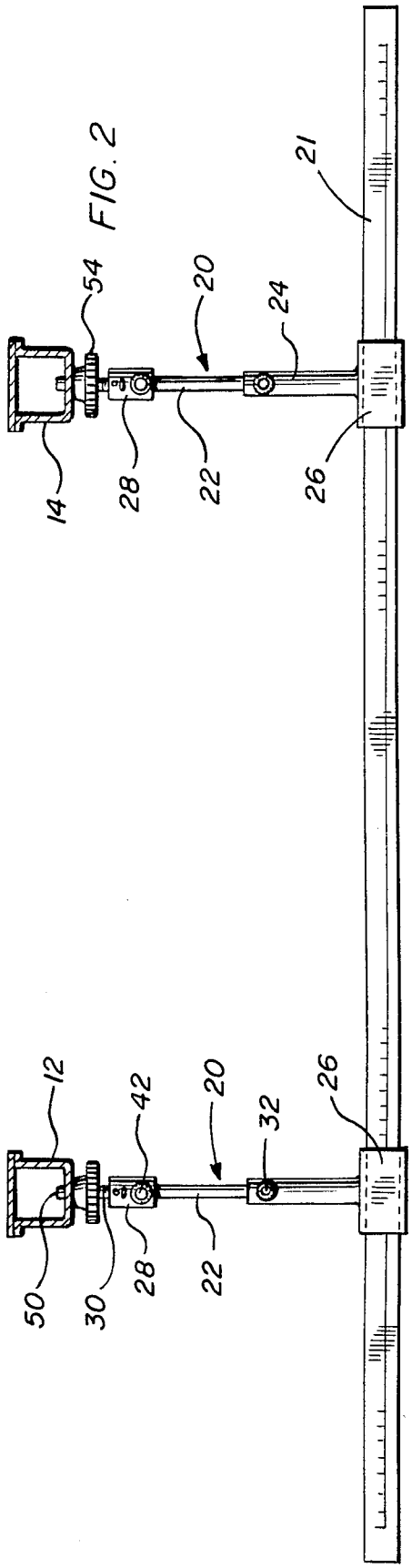

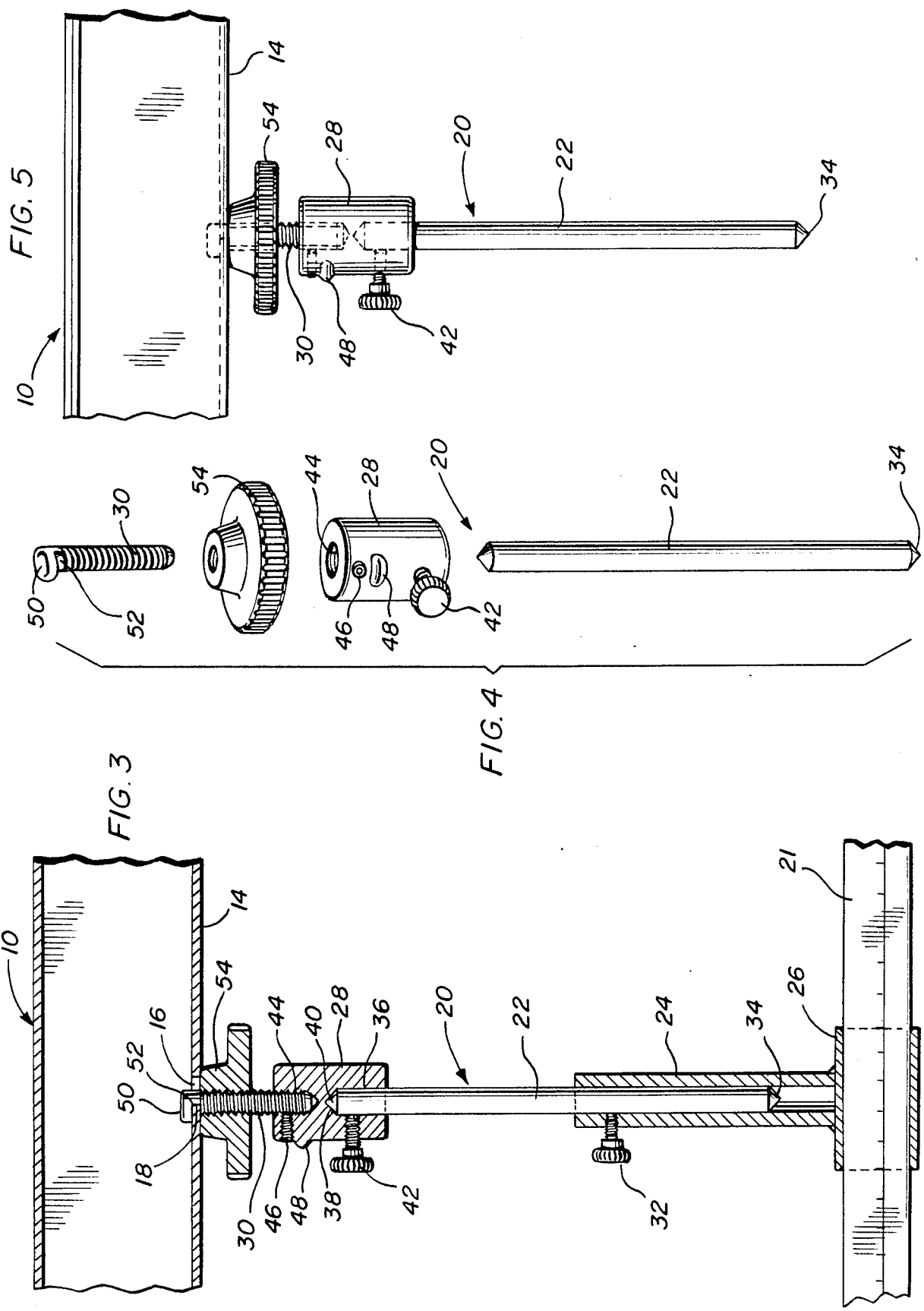

UNIBODY GAUGE SUPPORT

BACKGROUND OF THE INVENTION

1. Field of the Invention

This invention relates to an elongated longitudinally straight gauge member defining a longitudinal center line and to be used in vertical position. The upper end of the gauge member includes structure for releasable clamped engagement with the portions of a unibody frame portion defining a vertical bore therethrough and with the center line of the gauge member coextensive with a selected edge of the bore. The lower end of the gauge member includes structure defining a precise location also disposed on the center line of the gauge member.

2. Description of Related Art

Various different forms of gauges and gauge bar supports heretofore have been provided for mounting from predetermined vehicle frame portions in specific locations thereon. However, these previously known forms and gauges and gauge supports are not specifically designed to establish a measurement location spaced below an associated vehicle frame and with the measurement location disposed precisely vertically beneath a selected edge portion of a vertical bore formed through the associated frame portion and defining a frame dimension location. Accordingly, a need exists for a gauge and/or gauge bar support operative to precisely define a frame dimension location at a point spaced vertically beneath a predetermined edge portion of a bore formed through an associated vehicle frame portion.

SUMMARY OF THE INVENTION

The gauge and/or gauge bar support of the instant invention incorporates a vertical shank member having a horizontally opening notch formed in its upper end portion to a depth with the inner extremity of the notch coinciding with the longitudinal center line of the shank member and an abutment is carried by the upper end of the shank below the notch and is forcibly upwardly displaceable along the shank for abutting engagement with the underside of a vehicle frame portion having a vertical bore formed therein including a selected edge portion seated within the aforementioned notch. The abutment and the upward extremity of the notch are operative to clampingly engage those portions of the vehicle frame portion extending about the bore and the lower end of the shank member includes structure defining a measurement location coinciding with the longitudinal center line of the shank member.

The main object of this invention is to provide a frame location defining gauge or gauge bar support operative to establish a frame measurement location at a point spaced vertically beneath a frame measurement location established by a predetermined edge portion of a vertical bore formed through the frame.

Another object of this invention is to provide a frame measurement gauge member capable of suspending a portion of a horizontal gauge bar from the associated vehicle frame portion.

Yet another object of this invention is to provide a gauge member or gauge bar support which may be used in conjunction with various different frame dimension determining apparatuses.

A final object of this invention to be specifically enumerated herein is to provide an apparatus in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a perspective view of a vehicle frame or unibody reinforcing frame portion (schematically illustrated) with a plurality of gauge supports of the instant invention operatively supported therefrom and corresponding pairs of gauge supports being utilized to support gauge bars from the frame;

FIG. 2 is an enlarged vertical sectional view taken substantially upon the plane indicated by the section line 2—2 of FIG. 1;

FIG. 3 is an enlarged fragmentary vertical sectional view taken substantially upon the plane indicated by the section line 3—3 of FIG. 1;

FIG. 4 is an exploded perspective view of the gauge support; and

FIG. 5 is a fragmentary side elevational view of the assemblage illustrated in FIG. 3, but with the gauge bar supporting portion of the gauge member omitted.

DESCRIPTION OF THE PREFERRED EMBODIMENT

Referring now more specifically to the drawings, the numeral 10 generally designates a conventional vehicle frame including opposite side longitudinal members 12 and 14. The longitudinal members 12 and 14 each include longitudinally spaced vertical bores 16 therein and selected edge portions 18 of the bores 16 define frame dimension locations from which frame dimension measurements may be made during the process of straightening the frame 10.

It is pointed out that the frame 10 represents either a conventional vehicle frame on which a vehicle body (not shown) is mounted or the reinforcing member portions of a vehicle unibody.

The gauge member of the instant invention is referred to in general by the reference numeral 20 and may be used as a gauge member or as one of a pair of supports for supporting a gauge bar 21 beneath the frame 10. The gauge member 20 comprises an upright shank construction incorporating a central shank member 22, a lower end vertical sleeve member 24 from whose lower end a horizontal mounting sleeve 26 is supported, a connecting fitting 28 removably carried by the upper end of the shank member and an upper terminal end threaded shank supported from and projecting upwardly above the connecting fitting 28.

The shank member 22 is cylindrical and has its lower end snugly, slidably and rotatably received within the upper end of the sleeve member 24, the sleeve member 24 including a set screw 32 for retaining the lower end of the shank member 22 in adjusted position within the sleeve member 24. The lower terminal end of the shank member 22 includes a central conical tip 34 for a purpose to be hereinafter more fully set forth and the mounting sleeve 26 is generally square in cross section and slidably receives one end of a corresponding gauge bar 21 therethrough. The fitting 28 defines a downwardly opening blind bore 36 including a conical upper terminal end 38 and the upper terminal end of the shank member 22 includes a central conical tip corresponding to the central conical tip 34. The connecting fitting 28 also includes a set screw 42 corresponding to the set screw 32 and by which the upper end of the shank member 22 is releasably secured in position within the bore 36, the upper end of the shank member 22 being snugly, slidably and rotatably received in the bore 36.

The upper end of the connecting fitting 28 includes an upwardly opening threaded blind bore 44 in which the lower end of the threaded shank 30 is threadedly engaged and the connecting fitting 28 includes an upper set screw 46 for retaining the threaded shank 30 in adjusted position in the threaded bore 44. Further, the outer side of the connecting fitting 28 includes an outstanding position indicating tick 48 for a purpose to be hereinafter more fully set forth.

The upper end of the threaded shank 30 includes a laterally enlarged head 50 and has a laterally opening notch 52 formed therein immediately beneath the head 50. The innermost extremity of the notch 52 lies along the center line of the threaded shank 30. Further, the bores 44 and 36 are aligned. Accordingly, the central conical tip 34 is vertically aligned with the inner extremity of the laterally opening notch 52 and the notch 52 may have a convex inner extremity of a radius of curvature corresponding to the radius of curvature of the bore 16. It is also pointed out that the threaded shank 30 includes a hand nut 54 threadedly engaged thereon above the connecting fitting 28 and below the laterally enlarged head 50.

In operation, after the frame 10 has been suitably supported from a plurality of floor mounted jack stands (not shown), a plurality of the gauge members 20 may be supported from the frame 10. Initially, each hand nut 54 is threaded downward on the corresponding threaded shank 30 and the upper end of each threaded shank 30, including the laterally enlarged head 50 thereof, is inserted upwardly through a corresponding bore 16 with the designated edge portion 18 seated within the notch 52. Then, the hand nuts 54 are tightened in order to clampingly supported each gauge member 20 from the frame 10. At this point, it is pointed out that the ticks 48 designate the direction in which the notches 52 open so that the correct edge portions 18 of the bores 16 are seated in the notches 52. With the gauge members 20 thus mounted from the frame 10, the lower conical tips 34 are disposed immediately beneath the corresponding edge portions 18 and the frame dimensions between the tips 34 may be readily determined and the frame 10 may be straightened, as required, to correctly position the conical tips 34 relative to each other. On the other hand, each of the shank members 22 may have one of the sleeve members 24 removably supported therefrom so that gauge bars 21 may be suspended from the lower ends of a pair of selected gauge members 20. When the gauge bars 21 are supported from the sleeves 26, the various positions of the lower ends of the shank members 22 may be readily checked during frame straightening operations.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. In combination with a vehicle including a frame portion having a vertical bore therein from a selected edge of which a frame dimension location is defined, a gauge member including an upstanding mounting shank construction having first and second upper and lower ends, said upper end including means defining a laterally outwardly opening notch of a width extending longitudinally of said shank a distance slightly greater than the length of said bore, the inner extremity of said notch being coextensive with the longitudinal center axis of said shank construction, the upper end of said shank construction being upwardly receivable through said bore at least to a level with said notche registered with a portion of said frame defining said selected edge whereby the latter may be seated in said notch, abutment means carried by said shank construction below said notch and forcibly displaceable upwardly along said shank toward said notch for abutting engagement with said frame portion about said bore to clamp the portion of said frame portion defining said selective edge between said abutment and the portion of said shank defining the upper portion of said notch, the lower end of said shank including location determining means establishing a measurement location coinciding with the longitudinal center line of said shank construction.

2. The invention of claim 1 wherein said shank construction includes a shank member lower portion and said location determining means comprises a conical tip on the lower end of said shank member coinciding with the longitudinal axis of said shank construction.

3. The invention of claim 1 wherein said shank construction includes a shank member lower end portion and said location determining means comprises a sleeve member adjustably, telescopingly secured in position on the lower end of said shank member, the lower end of said sleeve member including a horizontal mounting sleeve for supporting one end of a horizontal gauge bar therefrom.

4. The invention of claim 1 wherein said means defining a laterally opening notch includes an upper end threaded shank portion carried by said shank construction and including a laterally enlarged head on the upper terminal end thereof and a laterally opening notch defined in said threaded shank immediately beneath said laterally enlarged head.

5. The combination of claim 4 wherein said abutment means comprises an abutment member threaded on said threaded shank.

6. The invention of claim 1 wherein said shank construction, below said abutment, includes means thereon indicating the direction in which said notch opens.

7. The invention of claim 6 wherein said means defining a laterally opening notch includes an upper end threaded shank portion carried by said shank construction and including a laterally enlarged head on the upper terminal end thereof and a laterally opening notch defined in said threaded shank immediately beneath said laterally enlarged head.

8. The invention of claim 7 wherein said abutment means comprises an abutment member threaded on said threaded shank.

9. The invention of claim 8 wherein said shank construction includes a shank member lower portion and said location determining means comprises a conical tip on the lower end of said shank member coinciding with the longitudinal axis of said shank construction.

* * * * *